Nov. 25, 1941.  A. W. LIPKIN  2,263,811
DEVICE FOR INTERMITTENTLY FEEDING ROLLING ARTICLES
Filed June 13, 1940
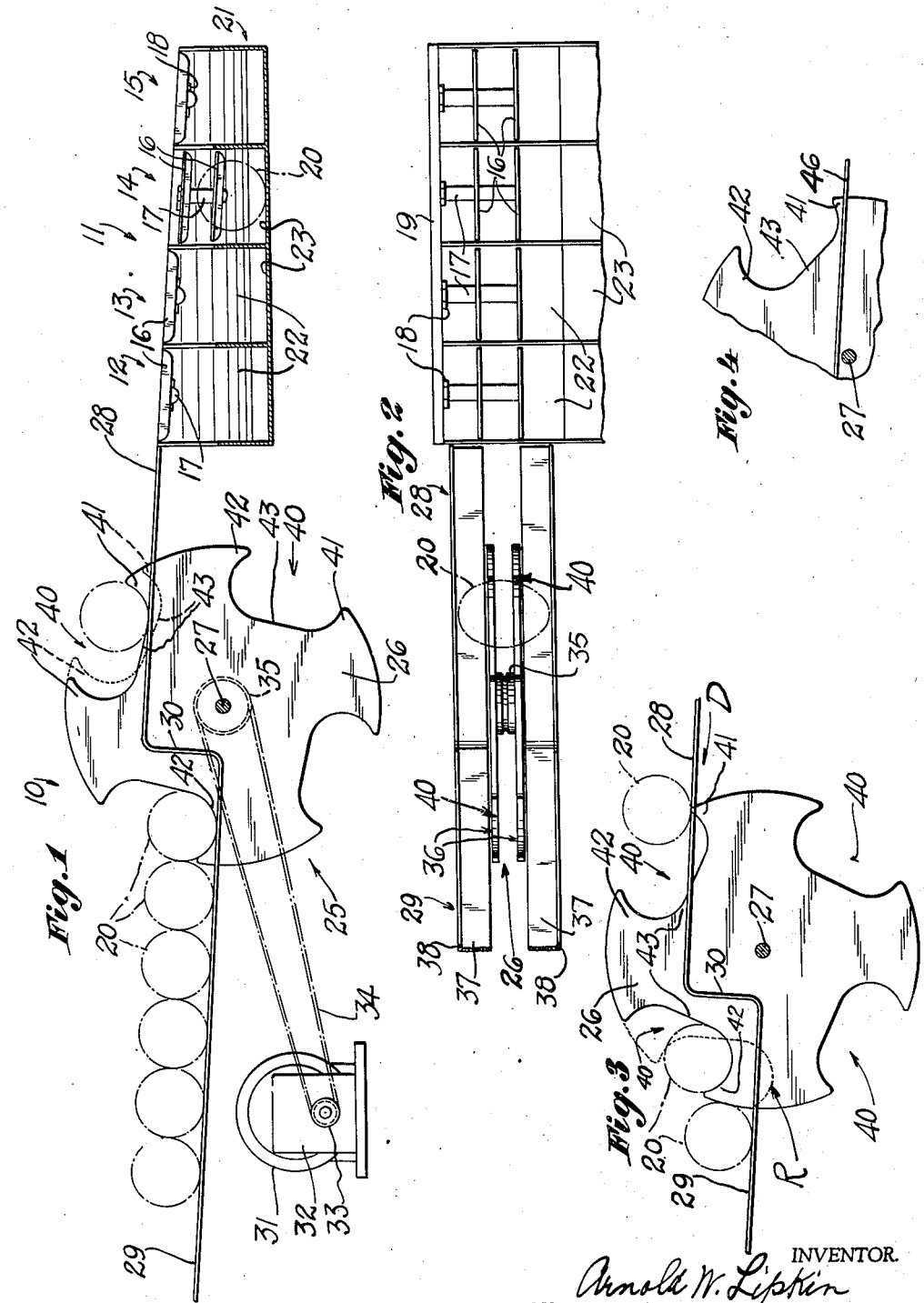
INVENTOR.
Arnold W. Lipkin
BY
Louis Shumacher ATTORNEY.

Patented Nov. 25, 1941

2,263,811

UNITED STATES PATENT OFFICE 2,263,811

DEVICE FOR INTERMITTENTLY FEEDING ROLLING ARTICLES

Arnold W. Lipkin, Brooklyn, N. Y.

Application June 13, 1940, Serial No. 340,260

8 Claims. (Cl. 209—73)

This invention relates to devices for the rotary intermittent feed of rolling articles along an inclined track.

One object of the invention is to provide means for placing the article on the track at relatively zero initial velocity, i. e., without causing the rotary member to impart an impulse to the article due to the speed of rotation of the member.

Another object of the invention is the provision of such a device wherein the device may wholly consist of an inclined stationary track and a one-piece rigid member rotating constantly in one direction, without requiring any mechanism or other moving parts.

Another object of the invention is to furnish an improved weight grading device of the inclined-track type wherein a one-piece rotary member shall supply rolling articles to the device at an exact predetermined velocity to assure that the article shall be at each weighing station for a predetermined period of time, whereby the device is operative in a reliable manner at maximum speed.

While the invention, in certain of its aspects, is applicable to devices other than those used for weight grading, a particular advantage of the invention will be perceived by considering the devices as used in the grading of eggs. For example, it is customary to grade eggs according to the following weights in ounces per dozen: 24, or more for large eggs; not less than 20.5 for medium eggs; and not more than 20.5, and also less than 20.5 for small eggs. It will, therefore, be seen that the difference in weight between the individual eggs is quite small. This requires a rather sensitive weighing device, and yet one which must be relatively cheap so that it can be used by farmers generally. Thus weighing devices of this type in use to-day are arranged to form an inclined track for automatic separation of the eggs at the different weighing stations. One apparatus in use to-day picks up each egg and deposits it at one station, then picks it up and deposits it at the next succeeding station, and so on, until the egg drops into its required repository; this apparatus uses a traveling vertically reciprocating grab member; its mechanism renders it unduly expensive for the average farmer. The more generally used device does not have any automatic feed, the eggs being successively laid down by hand, an egg being thus placed on the weighing device only after the preceding egg has completed its movement. This procedure is slow and tedious.

An effort has long been made by those skilled in the art to provide an automatic egg feeder for the weighing device, which would be extremely cheap so that the apparatus could be sold at small or nominal extra cost above that of the weighing device itself.

It is therefore an object of the invention to provide an apparatus which shall fill this need and overcome the drawbacks which occurred heretofore.

Another object of the invention is to furnish such improved means, also capable of engaging an article at the receiving end of the track without breaking or marring the article or shifting the same in whole or in part from its position on the track.

Other objects and advantages of the invention will become apparent as the specification proceeds.

With the aforesaid objects in view, the invention consists in the novel combinations and arrangements of parts hereinafter described in their preferred embodiments, pointed out in the subjoined claims, and illustrated in the annexed drawing, wherein like parts are designated by the same reference characters throughout the several views.

In the drawing:

Figure 1 is a diagrammatic view in side elevation of an apparatus embodying the invention, showing a pocket of the rotary member approaching its discharging position relative to the track, and showing the articles in dot-dash lines, and with certain parts broken away.

Fig. 2 is a fragmentary top plan view thereof with parts removed.

Fig. 3 is a fragmentary view in side elevation, showing the rotary member with a pocket thereof advanced to article discharging position, and showing articles in dot-dash lines, and indicating in dotted lines an article receiving position of a pocket.

Fig. 4 is a diagrammatic fragmentary view in side elevation of a modified device.

The advantages of the invention as here outlined are best realized when all of its features and instrumentalities are combined in one and the same structure, but, useful devices may be produced embodying less than the whole.

It will be obvious to those skilled in the art to which the invention appertains, that the same may be incorporated in several different constructions. The accompanying drawing, therefore, is submitted merely as showing the preferred exemplification of the invention.

Referring in detail to the drawing, 10 denotes an apparatus embodying the invention. The same may comprise any weight grading device 11 adapted for weighing eggs or similar rolling articles. This device may include an inclined track comprising a series of weighing stations 12, 13, 14 and 15. These stations may have like platforms 16 each of which comprises a pair of guides forming a track section, these guides being interconnected as by individual cross bars 17 below the guides, said bars being pivotally mounted as at 18 on a side wall 19, so that the platforms are downwardly swingable as illustratively indicated in dotted lines in Fig. 1 to discharge an article 20. The several platforms cooperate to form a continuous track as shown in Fig. 2, the track being momentarily broken when a track section or platform tilts downward. Chutes 21 for the platforms may include inclined troughs 22 for the individual platforms leading to their respective channels or compartments 23. In operation, when an egg is laid on the weighing device 11, it rolls to the right along the platforms 16, and causes tilting of a platform so that it is discharged into a chute 22, 23. The several platforms from left to right may be adjusted to respond to successively decreasing weights.

For reliable operation of the device 11, before depositing an article thereon, the platforms must be wholly clear of the next preceding article. This necessarily introduces a limitation in the speed of weight grading. With a device such as 11, the placing of the article 20 has heretofore been done by hand on a stationary track extension at the left of the device, which was just about large enough to receive the article.

At 25, I show an intermittent feeding device for placing rolling articles on an inclined track, according to the invention, so as to cause the articles to be suitably supplied to a device which is to perform a next operation with respect to the articles. The device 25 may include an upright rotary member 26 having a relatively fixed axis of rotation 27. Extending along the rotary member is an inclined track which may include a forward track section 28 and a rearward track section 29, arranged at different elevations, and interconnected, if desired, by an offsetting track section 30. The forward track section 28 is normally alined with the track of the device 11 so as to feed thereto the articles 20.

The device 25 provides a means that is constantly rotating in one direction, for which purpose I may provide an electric motor 31 having any speed reduction drive 32 for rotating a pulley 33 which drives a belt 34. The belt may engage a pulley portion 35 of the rotary member 26. As shown in Fig. 2, the latter may consist of a pair of like discs 36 which are fixedly interconnected by the pulley 35 therebetween, thus assuring an equalized torque, and constituting the peripheral portion of the wheel 26 a track for the articles 20. For convenience, the rotary member may be aptly described as a one-piece rigid structure. The track 29, 30 may include a plurality of spaced rails 37 which may consist of strips of sheet metal shaped to suit, and desirably formed with upwardly directed outer marginal lips 38 at the track sections 28, 29. Located in close relation between the rails 37 is the rotary member 26 so that the track of the latter forms a part of or is continuous with the track 28, 29.

Provided in the rotary member or wheel 26 are one or more spaced pockets 40 for receiving articles at the track section 29 and for discharging articles at the track section 28. Desirably a series of equally angularly spaced like pockets 40 are provided, so that a desired rate of feed of the articles 20 may be maintained without requiring undue speed of rotation.

Preferably the pockets 40 may be formed in the periphery of the wheel 26, and each pocket may include a first forward or leading-edge portion 41, a second or rear wall portion 42, and a third intermediate or bottom wall portion 43. As shown, the radial extent of the second wall portion 42 is greater than that of the leading portion 41. Differently described, the rear portion 42 constitutes an article engaging portion and may be suitably curved or shaped and made of sufficient size for this purpose, so as to act in the manner of a scoop in lifting an article off the track section 29, as the article rolls thereinto due to the inclination of the track. The bottom portion 43 is inclined forwardly adjacent to the discharging portion at the track section 28 so as to cause the article to roll toward the front portion 41. By elongating the pockets peripherally of the wheel, the article may thus be caused to move away from the said rear portion 42. The front or leading portion 41 may be regarded as a restraining element to prevent the article from prematurely rolling onto the discharging track section 28.

The article receiving position R is best indicated in the dotted line showing of a pocket 40 in Fig. 3, the rear wall 42 being wholly below the track section 29. As the article is carried upward, the point or projection of the wall 42 enters between this article and the next succeeding article to separate the same, and an adjacent circular edge of the wheel 26 forms a stop for the succeeding article. It will be appreciated that the track section 29 may carry a long row of the articles 20.

The article discharging position is indicated at D in Fig. 3, with the leading portion 41 being below the upper surface of the track section 28. In moving from R to D, the article is carried in its pocket to the right and over the wheel axis 27, with the article rolling down along the bottom wall portion 43 as the discharge position D is approached, see Fig. 1. Now the said bottom wall portion 43 moves below the adjacent part of the track section 28 so that the article 20 is seated on the track 28 while being retained by the leading portion 41 within the pocket. This is aided by a relatively small inclination, of only a few degrees, of the track section 28 or of at least that portion thereof which is immediately adjacent to the pocket, so that the article will not be accelerated to jump over the leading portion 41. This is further aided by the very small angle of inclination of only a few degrees of the bottom portion 43 of the pocket in the position shown in Fig. 1, so that the article 20 will not be accelerated to jump over the portion 41 as it rolls toward the same.

As rotation of the wheel 26 continues and the inclination of the bottom wall portion 43 of the pocket increases from that shown in Fig. 1, the article begins to rest upon the track section 28; hence the increasing angle of the pocket no longer controls the article; the article is now subjected to a torque determined only by the fixed angle of the track section 28. To assure proper placement on the latter of the article 20, the leading portion 41 exerts its restraining action and introduces a timing factor in the seating of the article.

As rotation continues, the leading portion moves downwardly, so that it exerts no lateral force on the article, but merely gently releases the article, so that it takes its position on that track at substantially zero velocity, and with the same effect as if placed by hand. The article now rolls down the track and onto the device 11.

The utility in making the leading portion 41 of small depth will now be clear. If the pocket were of uniform depth, the rear part 42 would not be cleared by the article but the latter would be crushed against the track.

The advantage in having the track section 29 adjacent to the elevation of the wheel axis 27 will also be apparent. If the latter were positioned so as to form a straight line with the section 28, the articles 20 could not lie as smoothly and without being disturbed or misalined by the element 42. This is especially important with eggs, which are oval shaped, and may be placed in a row with the large ends at either side of the row.

The reason for locating the track section 28 above the rotational axis 27 will be evident. Compare, for example, with Fig. 4, in which the adjacent part of the track section 28, indicated at 46, is located at the elevation of the wheel axis 27. The article will be caused to skip over the leading edge portion 41, which has now become the bottom part of the pocket. Thus the article will receive an initial momentum which will vary with different articles and introduce many uncertainties.

It will be appreciated that the device 25 must be absolutely fool-proof to guard against vibrational effects, which may be caused by adjacent machinery, and the like.

It will thus be seen that I have provided a device which fulfills the objects of the invention and is well adapted for practical use.

I claim:

1. An apparatus of the type having an intermittently feeding constantly rotating means for receiving and discharging rolling articles to an inclined weight grading device, including means rotating constantly in one direction comprising a wheel, and a relatively stationary track extending along the wheel, said wheel having a plurality of equally angularly spaced transverse like pockets in the periphery thereof, each pocket having a first article supporting portion adapted to engage and lift an article off the track with an adjacent peripheral part of the wheel serving as a stop for articles on the track, a second article restraining portion to restrain the discharge of an article from the pocket until the said second portion moves to a point below the track, the first portion having a greater radial dimension than the second portion, and a third portion intermediate of the first and second portion and extending therebetween to form a bottom wall for the pocket, said pocket being adapted to receive an article from the track at the rear side of the wheel axis and adapted to carry the article over the wheel axis to a discharging position on the track at the front side of said axis, said track having a downward frontward slope, said section of the track at said discharging position and said third portion having a relationship such as to afford a frontwardly downwardly sloping support for the article in said discharging position to cause the article to roll within the pocket away from the first portion and to the second portion, and the third portion moving below the track while the second portion is still above the track to restrain rolling of the article, so that the article is set down upon the track with substantially zero speed and free of impulse from the said first portion, whereby the article rolls onto the inclined weight grading device with a velocity determined substantially solely by the discharging section of the track.

2. An apparatus according to claim 1, wherein said track is located above the wheel axis with the second portion extending approximately vertically and the said third portion being at a small acute angle with the horizontal, adjacent to the discharging position, in order to cause the article to roll slowly toward the second portion to avoid jumping the latter.

3. An apparatus according to claim 1, wherein said track comprises vertically offset sections, such that the section at the receiving position is near the elevation of the wheel axis and the section at the discharging position is to a substantial extent above said elevation.

4. An apparatus according to claim 1, wherein the said third portion, in dropping below the adjacent part of the track while the said second portion remains above the said part of the track in approaching the discharging position, seats the article on the track, with the slope of the track being so small as to permit the article to remain momentarily seated on the track without jumping over the said second portion.

5. A device including an inclined weight grading device for articles adapted to roll along and to be separated at successive weighing stations, a constantly rotating uni-directional means including a wheel, a relatively stationary track, said wheel having a pocket of fixed size and shape, said pocket consisting of a first rear portion, a second front portion, and a third intermediate portion, the first portion having a greater radial dimension than the second portion, the third portion forming a floor for the pocket, the first portion being adapted to engage under an article on a first section of the track at the rear side of the wheel, an adjacent peripheral portion of the wheel serving as a stop for articles on said first track section, the second portion being adapted to pass below a second section of the track at the front side of the wheel at the article discharging position, said track sloping forwardly downwardly and the second section extending to the weight grading device, the third portion and said second section being so interrelated that one of them constitutes a downwardly forwardly sloping support for the article to cause the same to roll away from said first portion as the article approaches said discharging position, said third portion moving below the second track section while the second portion projects above the second track section to cause the article to be restrained from rolling while being set down on the second track section, so that the article is fed by the latter to the weight grading device at a velocity substantially independent of that of the wheel.

6. An apparatus of the type having an intermittently feeding constantly rotating means for receiving and discharging rolling articles to an inclined weight grading device, including means rotating constantly in one direction comprising a wheel, and a relatively stationary track extending along the wheel, said wheel having a plurality of equally angularly spaced, transverse, like pockets in the periphery thereof, each pocket having a first article supporting end portion adapted to engage and lift an article off the track with an adjacent peripheral part of the wheel serving as a stop for articles on the track, a second article restraining opposite end portion to restrain the discharge of an article from the pocket until the said second portion moves to a point below the track, the pocket having a peripheral length substantially greater than the depth thereof, and a third portion intermediate of the first and second portions and extending therebetween to form a substantially plane bottom wall for the pocket, said pocket being adapted to receive an article from the track at the rear side of the wheel axis and adapted to carry the article over the wheel axis to a discharging position on the track at the front side of the said axis, said track having a downward frontward slope, said section of the track at said discharging position and said third portion having a relationship such as to afford a frontwardly downwardly sloping support for the article in said discharging position to cause the article to roll within the pocket along the third portion, away from the first portion and to the second portion, the length of the pocket being such that the article when adjacent to its discharging position is sufficiently in advance of the first portion to preclude the latter from engaging and crushing the article against the track, and the third portion moving below the track while the second portion is still above the track to restrain rolling of the article, so that the article is set down upon the track with substantially zero speed and free of impulse from the said first portion, whereby the article rolls onto the inclined weight grading device with a velocity determined substantially solely by the discharging section of the track.

7. A device including an inclined weight grading device for articles adapted to roll along and to be separated at successive weighing stations, a constantly rotating uni-directional means including a wheel, a relatively stationary track, said wheel having a pocket of fixed size and shape, said pocket consisting of a first rear portion, a second front portion, and a third intermediate portion, the third portion forming a relatively plane floor for the pocket, the first portion being adapted to engage under an article on a first section of the track at the rear side of the wheel, an adjacent peripheral portion of the wheel serving as a stop for articles on said first track section, the second portion being adapted to pass below a second section of the track at the front side of the wheel at the article discharging position, said track sloping forwardly downwardly and the second section extending to the weight grading device, the third portion and said second section being so interrelated that one of them constitutes a downwardly forwardly sloping support for the article to cause the same to roll away from said first portion into contact with the second portion as the article approaches said discharging position, the length of the pocket being substantially greater than the depth thereof so that the article can roll away from the pocket to escape the approaching first portion thereof, said third portion moving below the second track section while the second portion projects above the second track section to cause the article to be restrained from rolling while being set down on the second track section, so that the article is fed by the latter to the weight grading device at a velocity substantially independent of that of the wheel.

8. An apparatus for the intermittent feed of rolling articles along an inclined track, comprising a longitudinally slotted inclined track and means constantly rotating in one direction, including an upright wheel forming a relatively rigid structure disposed between the ends of the track and within the slot thereof, said inclined track causing the wheel to receive articles from a first track section and to carry said articles upward and over to a second track section, said wheel having a pocket for receiving and carrying an article, and having a portion forming a stop portion for other articles on the track, said pocket and said track being so related to each other that an article is adapted to roll into and out of the pocket at the respective first and second track sections, said pocket being adapted to retain and hold the articles at intervening points of transit, the second track section being above the axis of the wheel and underlying the pocket as the latter begins to travel downward with the bottom of the pocket being inclined like the second track section and the pocket being elongated to cause the article to roll downwardly in the pocket, the pocket having a leading end portion to prevent the article from rolling out of the pocket, said pocket and said track being so coordinated with each other that as the pocket approaches the discharging position the bottom of the pocket drops below the adjacent part of the second section of the track to rest the article thereon while the leading end portion of the pocket remains above the track to still retain the article within the pocket, with the article being released only as the said leading end portion drops below the adjacent part of the track upon continued rotation of the wheel, whereby the inclination of the track is operative for further rolling movement of the article.

ARNOLD W. LIPKIN.